No. 656,873. Patented Aug. 28, 1900.
A. C. BADGER.
FIRE EXTINGUISHER.
(Application filed Apr. 16, 1900.)
(No Model.)
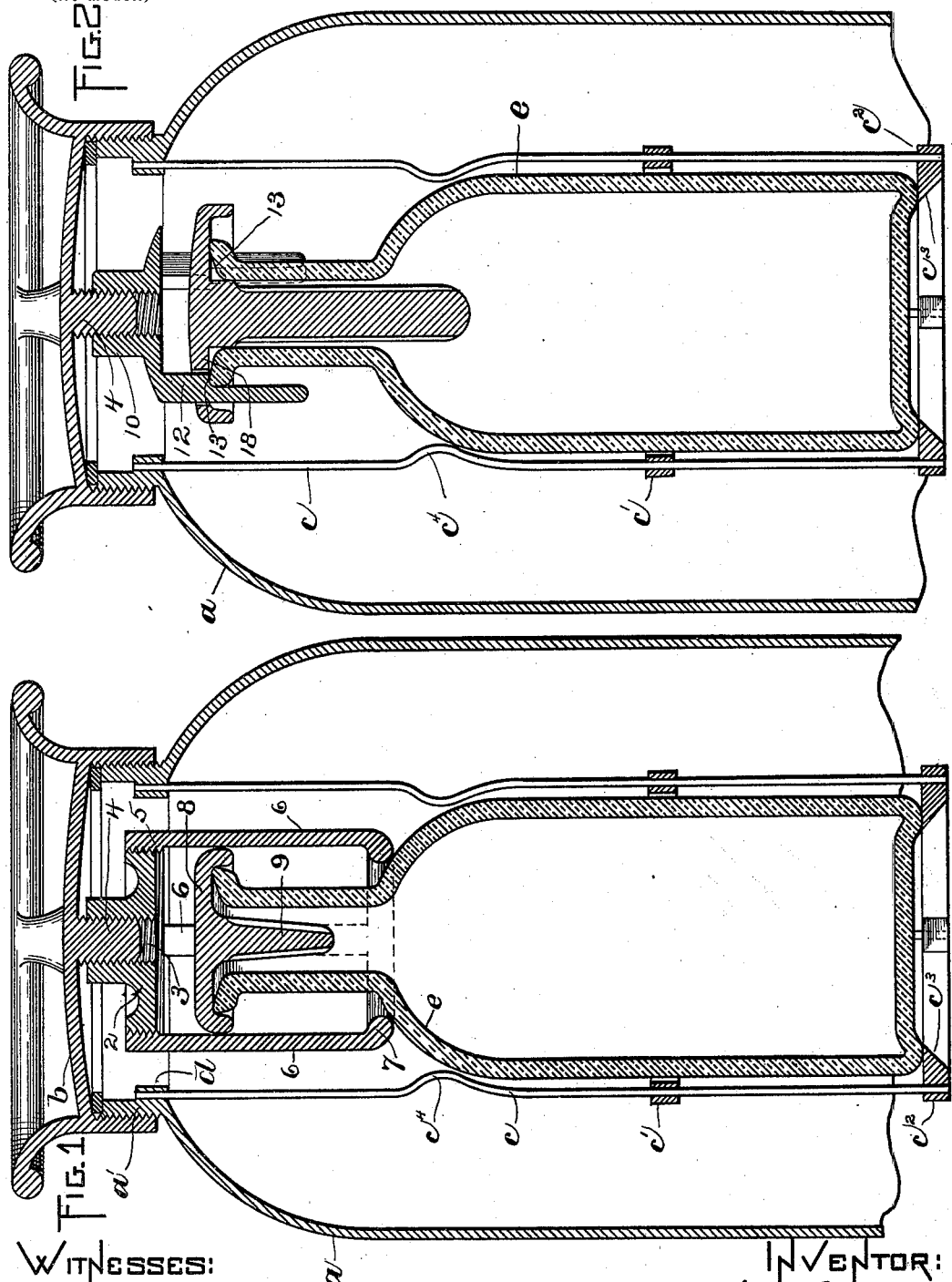
WITNESSES:
INVENTOR:

UNITED STATES PATENT OFFICE.

ARTHUR C. BADGER, OF BOSTON, MASSACHUSETTS.

FIRE-EXTINGUISHER.

SPECIFICATION forming part of Letters Patent No. 656,873, dated August 28, 1900.

Application filed April 16, 1900. Serial No. 13,001. (No model.)

*To all whom it may concern:*

Be it known that I, ARTHUR C. BADGER, of Boston, in the county of Suffolk and State of Massachusetts, have invented certain new and useful Improvements in Fire-Extinguishers, of which the following is a specification.

This invention relates to chemical fire-extinguishers in which a casing is employed having a detachable cap or cover and an outlet provided with a hose, the casing being provided internally with a holder for a bottle containing one of the chemical ingredients, the bottle having a gravity-stopper which opens when the casing is inverted and returns to its closed position when the casing is returned to an upright position. In apparatus of this kind it is common to provide means for guiding the gravity-stopper to and from its closed position, so that the stopper will readily open when the holder is inverted and as readily close to seal the contents of the bottle when the casing is restored to an upright position.

My invention has for its object to provide certain improvements in the stopper-guide, whereby it may be adjusted toward and from the neck of a bottle held in the holder within the casing, to the end that the stopper-guide may conform to the height of the bottle, so that in case it becomes necessary to use different bottles interchangeably and one bottle happens to be higher or lower than another the effectiveness of the stopper and its guide will not be impaired, the adjustability of the guide compensating for any differences in the size of the bottles employed.

My invention consists in the improvements which I will now proceed to describe and claim.

Of the accompanying drawings, forming a part of this specification, Figure 1 represents a longitudinal section of a fire-extinguisher embodying my invention, the lower portion of the casing or holder being broken away. Fig. 2 represents a similar view showing a somewhat different construction of stopper-guide embodying my invention.

The same reference characters indicate the same parts in both the figures.

In the drawings, $a$ represents the main casing or container, having an externally-screw-threaded neck $a'$, and $b$ represents the cap or cover, having an internally-threaded flange $b'$ engaged with the neck $a'$. Within the casing is a bottle-holder, composed in this instance of a series of longitudinal wire rods $c$, attached at their upper ends to sockets $d$, affixed to the interior of the neck $a'$, and rings $c'$ $c^2$, secured to the said rods at different heights, the ring $c^2$ having suitable ears $c^3$ projecting under the bottom of the bottle $e$ and acting as a support therefor. The rods $c$ are shown as provided with inwardly-projecting bends $c^4$, formed to bear yieldingly on the breast of the bottle, the said bends yielding when a bottle is forcibly drawn out or pushed in between them.

In connection with the casing, cover, and bottle-holder above described I employ a gravity-stopper for the neck of the bottle and a guide which permits the stopper to move by gravitation away from the bottle-neck when the casing is inverted and to move to its seat on the bottle-neck when the casing is placed upright, the said guide being adjustable to accommodate bottles of different heights. The preferred form of my improved stopper and guide is shown in Fig. 1, in which the guide is composed of a cage or basket comprising a disk or head 2, having an internally-screw-threaded orifice 3, the thread of which is engaged with a threaded stem or stud 4, formed on and projecting downwardly from the center of the cover $b$, an internally-threaded ring 5, engaged with an external thread on the head 2, vertical arms 6, formed on the ring 5 and projecting downwardly therefrom, and a contracted ring 7, formed on the lower ends of the arms 6 and adapted to bear on the breast of the bottle $e$. The stopper 8 is in this case a disk of suitable acid-proof material—such as lead, porcelain, &c.—said disk having its periphery formed to slide freely between the arms 6 and being provided with a central stud 9, which projects into the bottle-neck to prevent undue tipping of the stopper when it is sliding toward and from the bottle-neck.

It will be seen that the stud 4 and the internally-threaded orifice 3 constitute complemental coupling or connecting members which not only secure the guide to the cover, but permit the adjustment of the guide toward and from the bottle-neck. The external thread on the head 2 and the internal thread in the ring 5 provide an additional adjustment of the stopper-guide.

It frequently happens that when the bottle originally supplied with a chemical fire-extinguisher of this class has been broken and another bottle has to be supplied it is difficult to find a bottle which is an exact duplicate of the first, the bottles varying more or less in height. It will be seen, therefore, that my invention, which compensates for considerable variations in the height of the bottles, has in many cases a very marked advantage, making the apparatus equally operative with bottles of different heights. The adjustability of the stopper-guide and the provision of means for enabling it to exert pressure on the bottle to prevent movement of the latter out of its holder are also valuable features.

In Fig. 2 I have shown a different construction of adjustable stopper-guide, in which the guide is made in one piece, including an internally-threaded socket or connecting member 10, engaged with the stud 4 on the cover, and a series of parallel arms 12, connected with the socket 10 and having shoulders 13, formed to bear on the end of the bottle-neck. In this case the stopper 18 has a series of slots to receive the arms 12, the stopper being movable between the bottle-neck and the inner end of the socket member 10.

It will be seen that in the construction shown in Fig. 1 the inwardly-projecting ring 7 forms a shoulder, which engages the margin of the stopper when the cap $b$ is removed from the casing and removes the stopper from the bottle. The stopper is therefore permanently connected with the guide and cover, so that it cannot be lost or misplaced, as it might easily be if it were not thus permanently connected with its guide. The internal diameter of the ring 7 is greater than the external diameter of the mouth of the bottle-neck, so that when the guide is lifted the ring 7 passes freely over and away from the neck of the bottle.

I claim—

1. A fire-extinguisher comprising a casing having a neck and a detachable cap or cover therefor, a bottle-holder attached to the neck of the casing independently of the cover, a gravity-stopper adapted to close the neck of a bottle in said holder, a stopper-guide, and adjustable connections between the guide and cover whereby the guide may be adjusted toward and from the bottle-neck, and made operative with bottles of different sizes.

2. A fire-extinguisher comprising a casing having a neck and a detachable cap or cover therefor, a bottle-holder attached to the neck of the casing, a screw-threaded coupling or connecting member on the cover, and a stopper-guide having a complemental screw-threaded coupling or connecting member formed to engage the member on the cover, said members permitting the adjustment of the stopper-guide.

3. A fire-extinguisher comprising a casing having a neck and a detachable cap or cover therefor, a bottle-holder attached to the neck of the casing, a screw-threaded coupling or connecting member on the cover, and a stopper-guide having a complemental screw-threaded coupling or connecting member formed to engage the member on the cover, said members permitting the adjustment of the stopper-guide, said guide having means such as a ring or a series of shoulders for exerting downward pressure on the bottle.

4. A fire-extinguisher comprising a casing having a neck and a detachable cap or cover therefor, a bottle-holder attached to the neck of the casing, a screw-threaded coupling or connecting member on the cover, and a stopper-guide composed of an externally-threaded head having a threaded coupling member to engage the coupling member on the cover, an internally-threaded ring to engage the external thread on the head, stopper-guiding arms on said ring, and a bottle-confining ring on the lower ends of said arms.

5. A fire-extinguisher comprising a casing having a neck and a detachable cap or cover therefor, a bottle-holder attached to the neck of the casing, a gravity-stopper adapted to close the neck of a bottle in said holder, and a stopper-guide supported by said cover and having means for retaining the stopper when the cover is removed from the casing.

6. A fire-extinguisher comprising a casing having a neck and a detachable cap or cover therefor, a bottle-holder attached to the neck of the casing, a gravity-stopper adapted to close the neck of a bottle and projecting outside of said neck, and a stopper-guide attached to the cover and having stopper-guiding arms and a stopper-retaining ring at the lower ends of the arms, formed to engage the projecting portion of the stopper.

In testimony whereof I have affixed my signature in presence of two witnesses.

ARTHUR C. BADGER.

Witnesses:
C. F. BROWN,
A. D. HARRISON.